(12) United States Patent
Chen

(10) Patent No.: US 12,714,069 B1
(45) Date of Patent: Aug. 25, 2026

(54) PET WASHING STATION INCLUDING FAST DRYING SUBSYSTEM

(71) Applicant: Hangzhou Jingjie Technology Co., Ltd., Hangzhou (CN)

(72) Inventor: Yiying Chen, Hangzhou (CN)

(73) Assignee: Hangzhou Jingjie Technology Co., Ltd., Hangzhou (CN)

(*) Notice: Subject to any disclaimer, the term of this patent is extended or adjusted under 35 U.S.C. 154(b) by 0 days.

(21) Appl. No.: 19/383,545

(22) Filed: Nov. 7, 2025

(30) Foreign Application Priority Data

Sep. 18, 2025 (CN) ......................... 202522013943.4

(51) Int. Cl.
*A01K 13/00* (2006.01)

(52) U.S. Cl.
CPC .................................. *A01K 13/001* (2013.01)

(58) Field of Classification Search
CPC ........ A01K 13/00; A01K 13/001; A61D 7/00; A61D 11/00
See application file for complete search history.

(56) References Cited

U.S. PATENT DOCUMENTS 4,977,690 A * 12/1990 Davis, Jr. .............. F26B 21/001 34/100
5,199,118 A * 4/1993 Cole ........................ A47K 1/04 4/619
5,724,918 A * 3/1998 Navalon-Chicote .......................... A01K 13/001 119/668
5,738,044 A * 4/1998 Gaylinn ............... A01K 13/001 4/596
6,063,421 A * 5/2000 Barravecchio ...... A47J 37/1219 99/332
D493,259 S * 7/2004 Itoiz Oroz ................... D30/158
D1,044,160 S * 9/2024 Chen ............................ D30/158
D1,081,025 S * 6/2025 Murgu ......................... D30/158
2015/0000610 A1* 1/2015 Caldwell .............. A01K 13/001 119/673

FOREIGN PATENT DOCUMENTS

| | | | | | |
|---|---|---|---|---|---|
| CN | 118383287 A | * | 7/2024 | ............. | A01K 13/00 |
| FR | 2580467 A | * | 10/1986 | ............. | A01K 13/00 |
| KR | 20100003247 U | * | 3/2010 | ............. | A01K 13/00 |
| KR | 20160000823 U | * | 3/2016 | ........... | A01K 13/001 |
| WO | WO-2020235753 A1 | * | 11/2020 | ........... | A01K 13/001 |

* cited by examiner

*Primary Examiner* — Ebony E Evans
(74) *Attorney, Agent, or Firm* — Zhong Law, LLC

(57) ABSTRACT

A pet washing station includes a basin and an overhead structure having a first side wall, a second side wall, a back wall, and a hood structure that houses a drying subsystem. The drying subsystem includes an air blower with an electric motor and a fan, an air-duct pathway, a control system, and a power supply. The air-duct pathway has an inlet at a first end and an outlet at a second end; the outlet couples to a first through-hole in the first side wall and the inlet couples to a second through-hole in the second side wall. A power switch switchably connects the electric motor to the power supply; when switched on, the electric motor drives the fan to draw air in through the inlet and blow air out through the outlet.

12 Claims, 3 Drawing Sheets

PET WASHING STATION INCLUDING FAST DRYING SUBSYSTEM

CROSS-REFERENCE TO RELATED APPLICATIONS

The present disclosure claims priority to Chinese Patent Application No. 202522013943.4 filed Sep. 18, 2025, which is incorporated herein by reference in its entirety.

TECHNICAL FIELD

The disclosure relates to pet-grooming equipment and, more particularly, to a pet washing station that integrates a drying subsystem. The drying subsystem can be built within an overhead hood structure of the pet washing station to provide temperature and strength controlled airflow while addressing safety, noise, and hair-filtration concerns.

BACKGROUND

A pet in this disclosure refers to a domestic or tamed animal (e.g., a dog, a cat etc.). Conventional pet washing stations typically provide a basin where a pet (e.g., a dog) may be washed by a handler (e.g., a trained animal specialist). Drying is commonly performed with a separate, portable dryer, which increases cost and inconvenience and may require moving the pet off the station to a drying area, causing floor splashing and additional cleanup.

SUMMARY

Integrating a drying subsystem into the washing station presents challenges, including protecting electrical components from water, providing comfortable and quiet airflow for sensitive animals, and preventing hair and moisture from fouling air ducts and motors. Implementations described herein address these needs by integrating a controlled, filtered, and insulated drying subsystem into a station that remains ergonomic for the handler and safe for the pet.

A pet washing station includes a basin and an overhead structure having a first side wall, a second side wall, a back wall, and a hood structure that houses a drying subsystem. The drying subsystem includes an air blower including an electric motor and a fan, an air-duct pathway, a control system, and a power supply. The air-duct pathway has an inlet at a first end and an outlet at a second end; the outlet is coupled to a first through-hole in the first side wall and the inlet is coupled to a second through-hole in the second side wall. A power switch switchably connects the electric motor to the power supply; when being switched on connecting to the power supply, the electric motor drives the fan to draw air in through the inlet and blow air out through the outlet.

In some examples, a flexible tube connects at one end to the outlet and at the other end to a nozzle for directional blow of drying air flows; when the electric motor runs, air flows through the flexible tube and exits the nozzle. The inlet carries a filter covered by a porous cap; the filter may be washable sponge. The subsystem may include a heating element coupled to the electric motor circuit and switchably powered so that, when energized, it heats the air flows discharged from the outlet.

The control system further includes control circuitry that controls the electric motor to a target rated speed and the heating element to a target air temperature. The control panel provides user-interface elements that set a desired air-blow strength and temperature; the circuitry drives the electric motor to the speed that yields the selected strength and modulates heater power to maintain the selected temperature in the duct.

The electric motor may be wrapped by an insulation sheet to reduce noise. The station may further include a base on which the basin is mounted and over which the overhead structure is arranged; in some examples, the base, basin, and overhead structure are stainless steel and the base provides four legs. The basin's front side plate may have a first portion with a transparent window and a second portion that folds between a closed position forming a complete enclosure at the front side plate and an open position forming a ramp. The hood structure may include a lamp board at its bottom surface carrying at least one LED lamp with an optical cover. In some examples, the station has an overall width of about 30-60 inches, an overall depth of about 30 inches, and an overall height of about 60 inches.

DETAILED DESCRIPTION

In order to further describe technical means and effects adopted in the present disclosure to achieve the intended purposes of the present disclosure, specific implementations, structures, features, and effects thereof according to the present disclosure are described in detail below with reference to the accompanying drawings and preferred examples.

Figure 1A:
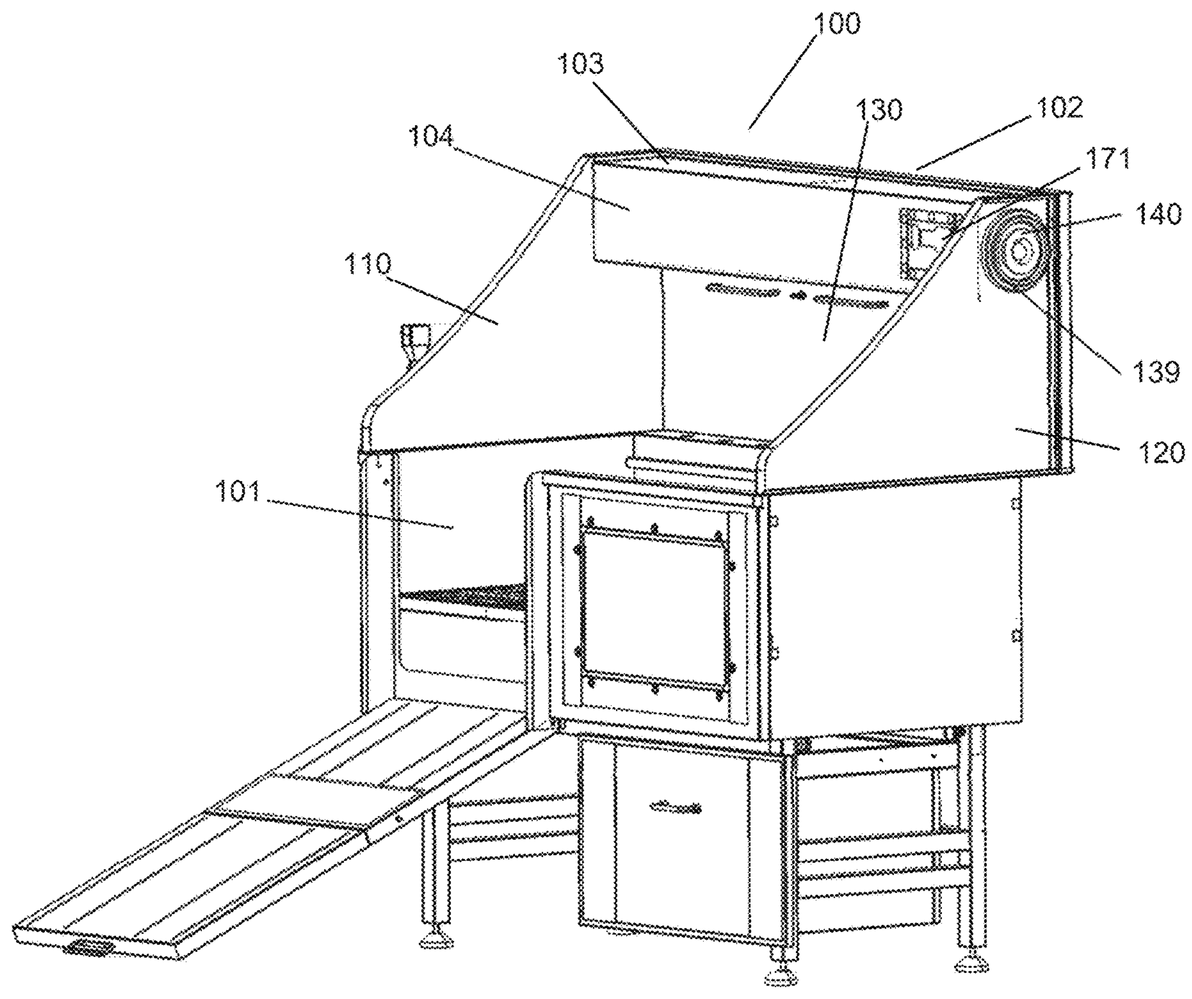
FIG. 1A is a schematic view showing the left-side structure of the pet washing station according to an implementation of the disclosure.

As shown in FIG. 1A, a pet washing station 100 includes a wash basin 101 and an overhead structure 102 mounted on top of the wash basin 101. The overhead structure 102 includes a left side wall 110, a right side wall 120, and a back wall 130, and supports a hood structure 103 that defines an internal installation space accommodating lighting equipment and a drying subsystem 104. The wash basin 101 provides a stable, splash-containing work area for bathing. The elevated overhead structure 102 positions the hood structure 103 and the associated electrical/mechanical elements away from water, improving ergonomics and visibility and isolating moving parts from splash, thereby enhancing safety, durability, and ease of cleaning. By providing the drying subsystem 104 above the wash basin 101, a pet may be dried directly after bathing without separately prepared drying equipment, which promotes the pet's health.

In some examples, the hood structure 103 is an elongated structure including a hollow duct or passage, the sides of the hood structure are surrounded by stainless steel side walls having openings at both ends. The outer cross-section of the hood structure 103 may be rectangular, square, or circular. A first end of the hood structure 103 may be fixed on a first side plate (left or right) and coupled to a first through-hole on that side plate, and a second end of the hood structure 103 may be fixed on a second side plate (right or left) and coupled to a second through-hole on that side plate, such that the hood structure 103 is mounted on the rear wall of the overhead structure 102 and positioned over the wash basin.

Figure 1B:
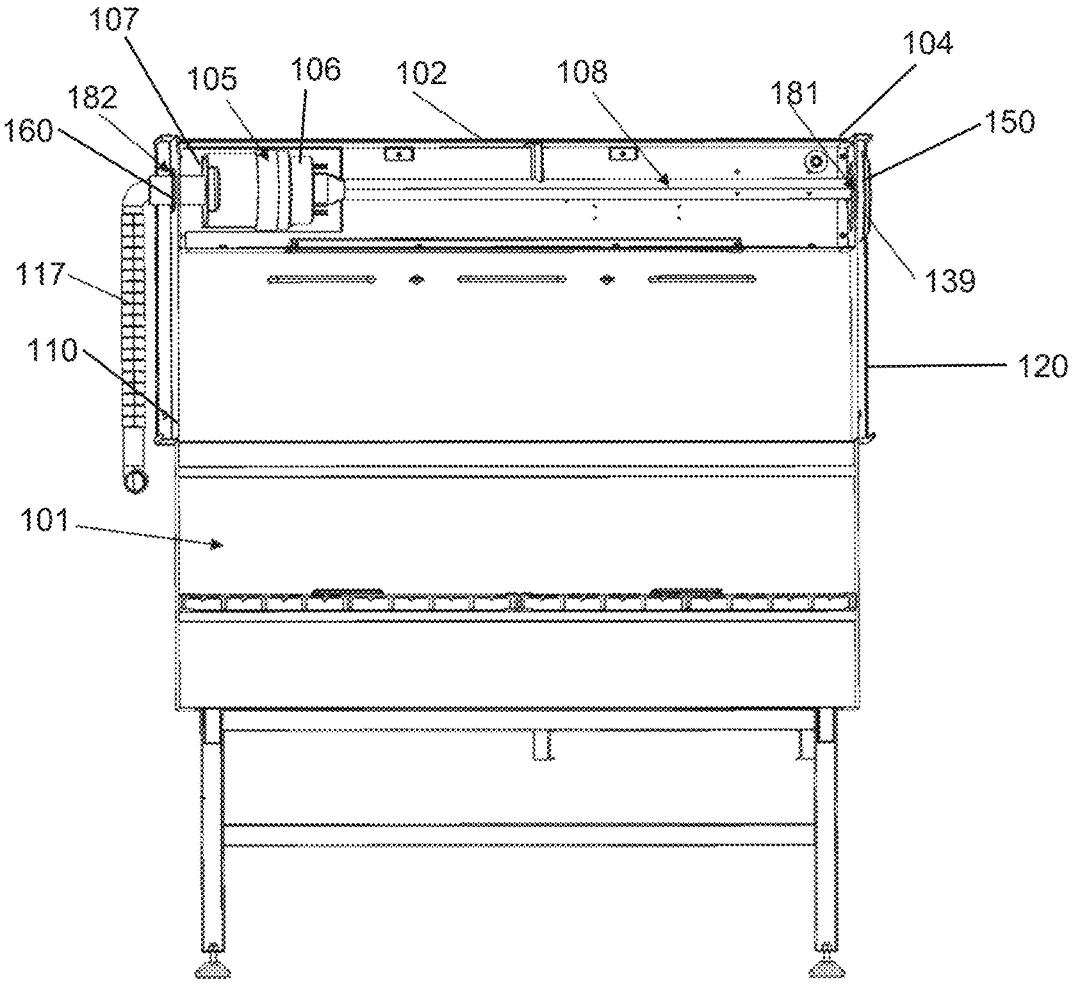
FIG. 1B is a sectional view showing an overhead structure of the pet washing station according to an implementation of the disclosure.

As shown in FIG. 1B, the drying subsystem 104 includes an air blower 105, a power supply 106, a control system 107, and an air-duct path 108. The air blower 105 may include an electric motor coupled to a fan, and the electric motor is powered by the power supply 106. The air duct path 108 may include a duct body having an inlet 181 at a right end of the duct body and an outlet 182 at a left end of the duct body, the fan may be positioned adjacent to the outlet 182 which is coupled to a first through hole 160 in the left side wall 110, and the inlet 181 is coupled to a second through hole 150 on the right side wall 120. During operation, the fan draws air through the inlet 181 and discharges air through the outlet 182. Locating the inlet 181 and outlet 182 on opposite sides of the overhead structure 102 establishes a smooth, low-recirculation flow path that reduces noise and promotes efficient drying while keeping electrics within the shielded hood structure 103 to mitigate splash exposure.

In some examples, the control system 107 may include a control panel 171 (shown in FIG. 1A) and a power switch for switchably connecting the power supply 106 to the electric motor. When the electric motor is switched to connect with the power supply, the electric motor is turned on to drive the fan for blowing air out through the outlet and drawing air in through the inlet. Then, the motor drives the fan at a target speed to deliver airflow from the outlet 182 into a flexible tube 117 (shown in FIG. 1), enabling the user to direct air from a nozzle to dry the pet. As shown in FIG. 1A, the control panel 171 may be a smart touch control panel which uses a sealed capacitive interface with back-lit icons and a numeric display. The control panel may provide user-interface elements (e.g., buttons or selectors). When actuated, they set a desired air-blow strength and temperature setpoint. Users may adjust airflow level and temperature with tap up/down keys or a slider, and may select presets (Gentle/Normal/Turbo). The panel may store the last-used settings and supports a timer with auto cool-down and shut-off. The panel may provide a lock function preventing accidental changes during washing. The panel may also provide status indicators report filter-clean reminders, over-temperature, and motor faults. The flush glass face is splash-resistant and easy to sanitize, and it remains responsive to gloved hands. In some examples, the control system further includes control circuitry to control the electric motor to a target rated speed and the heating element to a target outlet-air temperature. The control circuitry drives the electric motor to the corresponding speed (e.g., via PWM or voltage control). It modulates power to the heating element to reach and hold the selected temperature in the air-duct path. Optional feedback (fan tachometry and a duct temperature sensor) maintains the commanded values at the outlet. This coordinated control keeps drying consistent, comfortable, and quiet.

Figure 2:
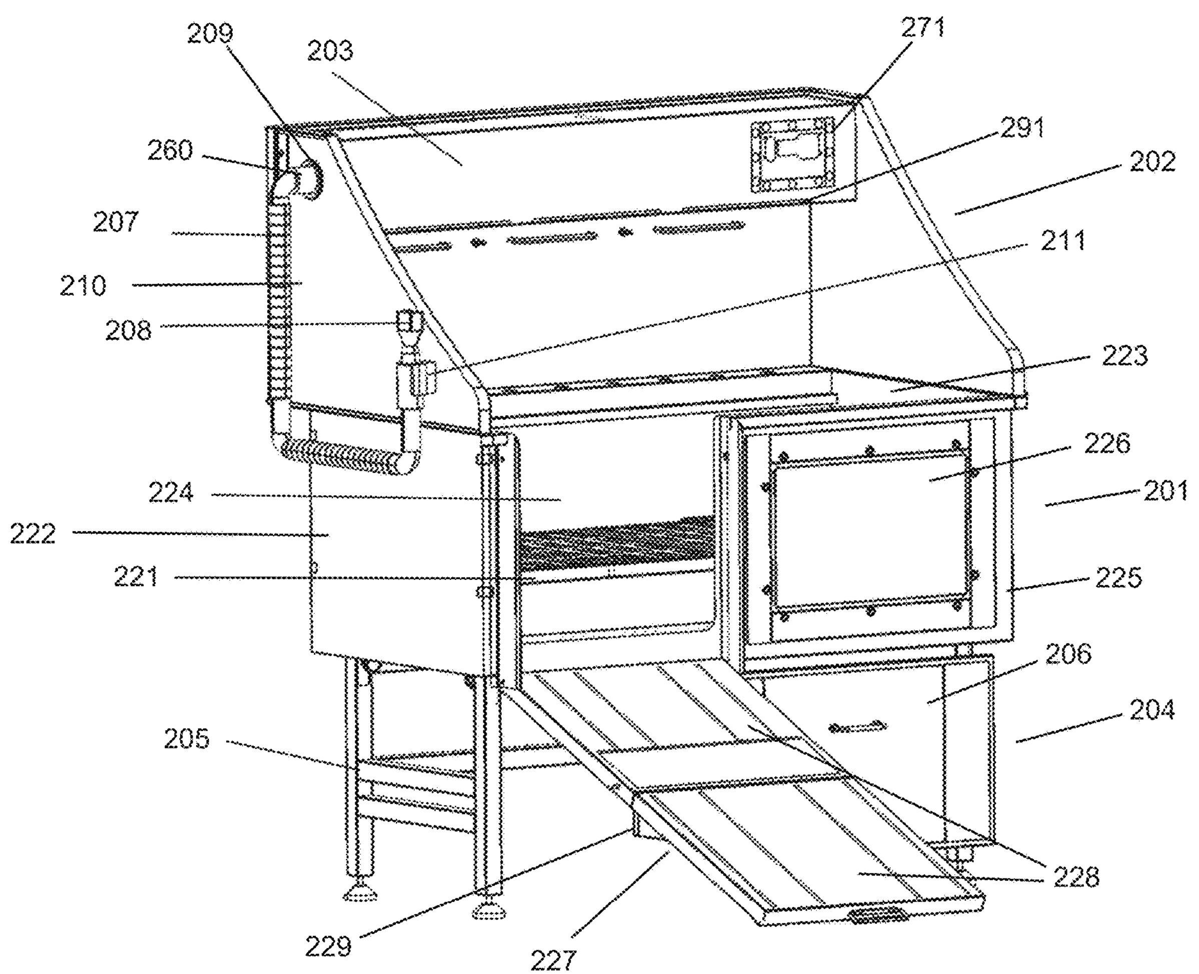
FIG. 2 is a schematic view showing the right-side structure of the pet washing station according to an implementation of the disclosure.

As shown in FIG. 2, a flexible tube 207 is arranged proximate the left side wall 210 of the hood structure 203. One end of the flexible tube 207 is connected to a nozzle 208, and the other end of the flexible tube 207 is in fluid communication with the outlet 209 of the air-duct path through a conduit 260. In some examples, the connection between the nozzle 208 and the flexible tube 207 is detachable (e.g., threaded connection, snap-fit, or clamp connection) to facilitate replacement or cleaning of the nozzle 208 and allows precise targeting of the airstream around sensitive regions to shorten drying time and reduce unnecessary heat exposure. The nozzle 208 may include a spray head and a flow control switch. A user may use the flow control switch to turn the airflow at the spray head on or off, and to adjust spray strength and temperature for comfortable washing.

As shown in FIG. 1A, the drying subsystem 104 further includes a filter 139 and a porous cap 140 at the inlet 181. The porous cap 140 covers the filter 139 and the inlet 181. The filter 139 may be a washable sponge or similar media that intercepts moisture and hair before they reach the duct. The filter 139 may have a plastic or metal mounting portion secured to the right side wall of the overhead structure 102 by fasteners. The porous cap 140 may be detachably coupled to the mounting portion. In some examples, the porous cap 140 and the mounting portion have mating threads to provide a screw-on connection. The detachable design allows quick removal and cleaning or replacement of the media, maintains intake area, and prevents hair and large dust from entering the air-duct path, thereby extending the service life of the drying subsystem.

In some examples, the drying subsystem further includes a heating element operatively coupled to or in the electric motor and powered by the power supply, and wherein the heating element is switchably connected to the power supply, and when the heating element is connected to the power supply, the heating element may controllably heat up the blowing air out of the outlet. The heating element may be disposed within the air-duct path so that air drawn through the inlet is warmed as it passes toward the outlet. The control system may modulate power to the heating element (e.g., stepped or duty-cycle control tied to user-selected set-points) and, where provided, use temperature feedback within the duct to maintain a stable outlet temperature. During operation, the heating element may elevate the airstream temperature to accelerate evaporation from the animal's coat, allowing effective drying at lower airflow levels for improved comfort and reduced noise. The heating element may also deliver ambient-air drying suitable for warm conditions or sensitive areas. Locating the heating element inside the hood structure and within the enclosed duct keeps electrics splash-shielded and out of reach of the animal, and optional over-temperature protection and a brief post-use cool-down further enhance safety and component longevity.

In some examples, the electric motor may be wrapped by an insulating sheet. The sheet may surround the electric motor with a small clearance. The insulation sheet may be foil-faced foam, fiber mat, or laminated acoustic felt. A moisture-resistant outer layer may be used. The sheet may be fixed with straps, clips, or adhesive tabs, leaving openings for leads and fasteners. The insulating sheet may lower airborne and structure-borne noise. It may shield the pet from noise and hot surfaces and improve bathing safety.

As shown in FIG. 2, the pet washing station further includes a base 204, wherein the wash basin 201 mounted on top of the base 204. The wash basin 201 may allow a pet (e.g., a dog) to stand while being washed by a user. The base 204 may include four legs 205 that support the wash basin 101 at a height above the ground suitable for a user to wash the pet in a standing or sitting posture. The legs 205 may be made of stainless steel or other sturdy material capable of supporting the weight of the wash basin 201 and the overhead structure 202. The base 204 may further include one or more drawers 206 built into the base 204 to provide storage space for supplies such as soap, shampoo, and towels. In some examples, the drawer 206 may span half of the width of the base 204 to hold bulky items such as towels, shampoos, and hoses. The drawer 206 may ride on full-extension, heavy-duty slides with soft-close action. The pan and face are stainless steel for hygiene and corrosion resistance. A removable bin or divider may be provided to separate wet and dry supplies.

As shown in FIG. 2, the wash basin 201 may include a bottom plate 221 (e.g., a stainless steel plate with a non-slip rubber mat), a left side plate 222, a right side plate 223, a rear side plate 224, and a front side plate 225. The left side plate 222 supports the left side wall of the overhead structure. The right side plate 223 supports the right side wall of the overhead structure. The rear side plate 224 supports the rear side wall of the overhead structure. The overhead structure 202 is supported by the left, right, and rear side plates of the wash basin 201.

As shown in FIG. 2, The front side plate 225 may include a first portion with a transparent glass window 226 and a second portion 227 that may be folded upward to serve as part of the front side plate, forming an enclosed space in which a user may wash the pet. The second portion 227 may be unfolded to form an opening that constitutes a ramp (e.g., a non-slip ramp), allowing the pet to enter or exit the wash basin 201 and to walk into or out of the wash basin 201 on the ramp. The second portion 227 may include two folding plates 228 connected by a metal hinge 229 located approximately at a middle joint of the ramp. The metal hinge 229 allows the ramp to fold upward and be pushed up to form part of the front side plate 225. In some examples, when folded to form the second portion of the front side plate, the two folding plates 228 may be securely locked in a face-to-face position. The folded plates may be pushed upward to be in the same plane as the first portion and may be securely locked to the first portion and to a side plate (right or left) using a lock (e.g., a hooked lip or bracket). When unfolded to form the ramp, a metal locking bracket or stabilizer bar at the joint position may snap or slide into place to prevent the ramp from folding while the pet is walking on it.

In some examples, the transparent glass 226 window permits continuous visual monitoring of the pet without opening the enclosure, which reduces handling and splash. It maintains line-of-sight between the animal and the handler, helping lower anxiety during washing. In some examples, the window is tempered or laminated safety glass sized to resist impact and thermal shock. A perimeter frame with a compressible gasket seats the pane and forms a water-resistant seal to the front side plate. Fasteners secure the frame flush with surrounding surfaces to simplify cleaning. Optional anti-fog and scratch-resistant coatings preserve clarity, and a light tint may reduce glare from the lighting. In some examples, etched or printed markings on the window indicate water level or positioning guides.

As shown in FIG. 2, an open clip ring 211 capable of elastic deformation is provided on an outer wall of the base 204 or the wash basin 201. A connecting portion of the nozzle 208 and/or of the flexible tube 207 connected to the nozzle 208 may pass through the opening of the open clip ring 211 into the ring and be clamped by the ring. The open clip ring 211 may employ a material having elastic deformability, for example aluminum or an aluminum alloy, which facilitates placement and removal while providing sufficient supporting force.

As shown in FIG. 2, a lamp board 291 is mounted at the bottom of the hood structure 203. The lamp board 291 may carry one or more LED modules and an optical cover. The optical cover acts as a diffuser and splash guard. The LEDs direct light downward into the wash basin 201 to illuminate the work area. A low-voltage driver is housed inside the hood structure 203 and powers the LEDs. Wiring may be routed within the hood structure and passes through sealed grommets. The light is controlled from the control panel 271 or a switch and may include dimming. The assembly may use gaskets and an IP-rated lens to resist spray. This placement reduces glare, improves visibility, and avoids operator shadows. In some examples, the diffuser includes a prismatic pattern or baffle to limit direct view of the LEDs. A color temperature of 3000-5000 K with CRI≥80 provides accurate coat inspection.

In some examples, a high-end pure-copper (brass) faucet shower set may be deck-mounted on the rear side plate of the wash basin. The faucet shower set may use a single-lever mixing valve with hot/cold markings for precise temperature control. A gooseneck spout swivels 360°, allowing the stream to reach all corners of the basin and to park out of the spray path. A hand sprayer may provide two selectable spray modes (stream and shower) for quick rinsing and gentle washing. The assembly may be UPC-listed for plumbing compliance.

In some examples, the wash station has an overall width from about 30-60 inches. The overall depth is about 30 inches, and the overall height is about 60 inches. The overhead structure provides a rise of about 20 in above the rear wall, giving headroom for the drying subsystem 104 and lighting. The wash basin may provide an interior working height of about 20 inches from the basin floor to the overhead structure. A clearance of about 20 inches is available beneath the basin for plumbing or storage within the base. The ramp may have a length of about 40 inches and a width between about 16.8 inches and 20 inches.

The foregoing dimensions are nominal production values and may vary with size option and manufacturing tolerance. Equivalent metric dimensions may be used without departing from the scope of the examples described.

Terms such as "comprise", "include", or any other variants thereof herein are intended to encompass a non-exclusive inclusion, meaning that in addition to the elements listed, other elements that are not explicitly listed may further be included.

Directional terms such as "front", "back", "up", and "down" involved herein are defined by positions of parts in the accompanying drawings and between the parts, and are used solely for the clarity and convenience of explaining the technical solution. It should be understood that the use of the directional terms should not limit the protection scope of this disclosure.

Where there is no conflict, the foregoing examples herein and features in the examples may be combined with each other.

The foregoing descriptions are merely preferred examples of the present disclosure, and are not intended to limit the present disclosure. Any modification, equivalent replacement, and improvement made without departing from the spirit and principle of the present disclosure shall fall within the protection scope of the present disclosure.

What is claimed is:

1. A pet washing station, comprising:

a basin and an overhead structure, the overhead structure further comprising: a first side wall, a second side wall, a back wall, and a hood structure comprising a drying subsystem, wherein the drying subsystem comprises:

an air blower, an air ducting pathway, a control system, and a power supply, wherein the air blower comprises an electric motor and a fan that is coupled to the electric motor, the control system comprises a control panel and a power switch for switchably connecting the power supply to or disconnecting from the electric motor, the air ducting pathway comprises a duct body having an inlet at a first end of the duct body and an outlet at a second end of the duct body, the fan is arranged to couple with the outlet which is coupled to a first through hole in the first side wall, and the inlet is coupled to a second through hole in the second side wall.

2. The pet washing station of claim 1, wherein when the electric motor is switched to connect with the power supply, the electric motor is turned on to drive the fan for blowing air out through the outlet and drawing air in through the inlet, the pet washing station further comprising a flexible tube with a first end being coupled to a nozzle and a second end being coupled to the outlet, wherein when the electric motor is switched to connect with the power supply, the electric motor is turned on to drive the fan for blowing air through the flexible tube out of the nozzle.

3. The pet washing station of claim 1, wherein the drying subsystem further comprises a filter and a porous cap, wherein the filter is arranged at the inlet of the duct body and the porous cap covers the filter and the inlet, and wherein the filter is made from washable sponge.

4. The pet washing station of claim 1, wherein when the electric motor is switched to connect with the power supply, the electric motor is turned on to drive the fan for blowing air out through the outlet and drawing air in through the inlet.

5. The pet washing station of claim 1, wherein when the electric motor is switched to connect with the power supply, the electric motor is turned on to drive the fan for blowing air out through the outlet and drawing air in through the inlet, and wherein the control system further comprises control circuitry to control the electric motor to operate at a target rated speed, and wherein the control panel comprises user interface elements that when activated, set a target air blow strength and the target air temperature, and the control circuitry is to control the rated speed of electric motor to the target rated speed that generate the target air blow strength.

6. The pet washing station of claim 1, wherein the electric motor is wrapped by a sheet of insulation material to reduce a noise level generated by the electric motor.

7. The pet washing station of claim 1, further comprising a base, wherein the base, the basin, and the overhead structure are made from stainless steel.

8. The pet washing station of claim 1, wherein the base comprises four (4) legs, the basin is arranged on top of the base, and the overhead structure is arranged on top of the basin.

9. The pet washing station of claim 1, wherein the basin comprises a front side plate having a first portion with a transparent window and a second portion foldable between a closed position completing the front side plate and an open position forming a ramp.

10. The pet washing station of claim 1, wherein the hood structure comprises a lamp board mounted at a bottom surface, wherein the lamp board comprises at least one LED module and an optical cover.

11. The pet washing station of claim 1, wherein the pet washing station has an overall width from about 30-60 inches, an overall depth of 30 inches, and an overall height of 60 inches.

12. A pet washing station, comprising:

a basin and an overhead structure on top of the basin, the overhead structure further comprising a drying subsystem, wherein the drying subsystem comprises:

an air blower and an air ducting pathway fixedly arranged on the overhead structure, the airduct pathway comprising an air passage extending from a first side wall of the overhead structure to a second side wall of the overhead structure, wherein the drying subsystem further comprises a control system and a power supply, the control system comprises a control panel and a power switch for switchably connecting the power supply to or disconnecting from an electric motor, the air passage comprises an inlet at a first end of the air passage and an outlet at a second end of the air passage, a fan is arranged to couple with the outlet which is coupled to a first through hole in the first side wall, and the inlet is coupled to a second through hole in the second side wall.

* * * * *